WILLIAM McNABB.
Improvement in Cotton-Bale Ties.
No. 126,645.                                    Patented May 14, 1872.
FIG. 2.                                         FIG. 1.
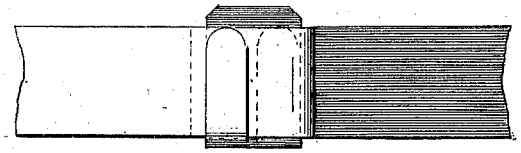    
FIG. 5.            FIG. 4.            FIG. 3.
        
FIG. 8.            FIG. 7.            FIG. 6.
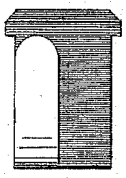        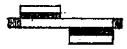
FIG. 11.           FIG. 10.           FIG. 9.
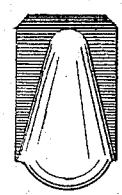       
FIG. 14.           FIG. 13.           FIG. 12.
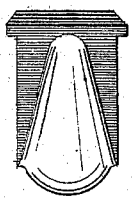      
William McNabb

126,645

UNITED STATES PATENT OFFICE.

WILLIAM McNABB, OF No. 6 CAMBRIDGE TERRACE, LONDON ROAD, CLAPTON, ENGLAND.

IMPROVEMENT IN COTTON-BALE TIES.

Specification forming part of Letters Patent No. 126,645, dated May 14, 1872.

SPECIFICATION.

I, WILLIAM McNABB, of No. 6 Cambridge Terrace, London Road, Clapton, in the county of Middlesex, England, have invented certain Improvements in Fasteners for Bands or Bale-Hoops, and in the modes or methods of applying the same, of which the following is the specification:

This invention relates to improvements in the construction of fasteners or fastenings for bands, and in the modes or methods of applying fasteners to metal bands or hoops, and relates chiefly to the means of fastening or securing together the two ends of a metallic band, which are bent, and take into, or overlap each other, in the manner hereinafter described; such bands being generally employed for surrounding and securing bodies or articles together in bulk, such as bales or bundles, which have been subjected to considerable compression in a screw or hydraulic press, and which bundles or bales require to be bound or "hooped about" so as to retain them in their greatly-reduced bulk due to their compressed state. The bands or hoops to which the said fasteners are applied must be capable of receiving a permanent "set" or bend, so that the ends are bent over the one in one direction and the other in the opposite direction, so as to take into one another by being slid sidewise, so as to interlock ready for receiving the fastener. I find it convenient and economical in baling cotton and many kinds of goods and merchandise to hoop or band them with hoop-iron, and turn back the ends short—as, for instance, the lower one by having its extreme end turned up and backward short, while the upper one is turned down and back short, so as to permit of their bent or hooked ends being slipped one into the other sidewise, with a space in the thickness thereof or between them that when they have been interlocked the two pieces of the band are, when looking on the plan view, in the same direct line. Between and upon or between and partly around these interlocked parts the fastener is applied, as hereinafter described, for the purpose of preventing the "opening out" or straining of the ends or their separation and "straightening out" when, by the expansion of the contents of the bale, the greatest strain is brought upon the ends of the hoop or band.

By this arrangement, the fastener being inserted between the hooked parts of the hoop ends, the several thicknesses thereof are clipped or held together by the fastener, which is in every case applied at or driven on from the side of the hoop or band, and so holds the bent ends together.

I am aware that clips, loops, or flattened rings have been applied for the purpose of securing the ends of hoops or bands for bales, and such "improved bale-goods fasteners" are first put over one or both ends of the hoop and are slid longitudinally along the hoops, as in Lampson's patent; but such fasteners do not readily permit of sampling or partially unbaling for the examination of the contents; and, moreover, two flat metal loops are required in accordance with the said invention for each band or hoop. I am also aware that the ends of "bale-hoops" or "bands" have heretofore been bent backward, and the bent ends or loops so formed have been secured or fastened by means of a "spear" or rod inserted into and passed through them; but the looped or bent ends or bars of each band are placed side by side, the width occupied at their crossing being double the width of the hoop or band, and the ends of the hoop are not in the same longitudinal straight line, but are at an angle to or with the spear or rod, so that the strain upon the two ends of the same hoop tends to twist or strain unequally the "spear" or rod by which the several hoops or bands are fastened. In every case the fastener is applied to or at one side of the hoop or band instead of being slipped over the end or ends longitudinally or along the hoop or band onto the joint, or over the ends like the sliding loops of leather used with leather straps, as in the latter case such hoops have to be "slid on" or "threaded on" to or over the end of the band or hoop before the joint is made or the crossing of the ends effected.

I bend the two ends of the hoop, as shown in the accompanying drawing at Figs. 1 and 2, so that they are of a suitable length to hold or secure the bale (several of them being employed for that purpose at suitable distances apart) and resist the expansive force which, upon the removal of the external pressure put on by the press, tends to burst the bale asunder, suitable allowance in the length of the loop being made for a slight degree of slackening out, which invariably takes place when the pressure is removed, so that the hooked ends may come together properly so as to receive the fastener. The fasteners to be employed in conjunction with the hooking or turning back of the ends of the bale-hoop, in manner described, present in side view a tri-pronged appearance, and are so formed and applied that the central portion prong or tongue enters between the folds or bent ends of each hoop, while the upper and lower portions clip the outsides of the bends or bent ends, thus grasping or clipping the several folds or thicknesses of the hoop at the joint firmly and securely together, and so as to prevent their "opening out." Instead of the three parts of the tri-pronged fastener being all of the same width, I prefer, in some cases, and where they are made from or cut out of plate-iron, to form them as at Figs. 3, 4, 5, 6, 7, and 8, as, by splitting the blank or piece of plate and turning one part up and the other down, the fastener is simply, readily, and cheaply made. Where malleable cast-iron or Bessemer or other cast-steel is used the fasteners may be formed as at Figs. 9, 10, 11, 12, 13, and 14. For the purpose of increasing the difficulty of removal of the fasteners from accidental or other causes I form a notch or shoulder at the point of the central piece or tongue, as shown in Figs. 6, 7, and 8, and at Figs. 12, 13, and 14.

In the accompanying drawing, Figure 1 is an edge view of the two ends of the band or hoop, showing the hooking over of the ends and the mode in which they take into each other, and also the manner in which the fastener is applied thereto. Fig. 2 is a plan view of Fig. 1, showing the top side of the bale-hoop and the fastener applied thereto. Figs. 3, 4, and 5 are, respectively, end, edge, and side views of the fastener, such as is shown applied to Figs. 1 and 2. These fasteners may be cut out of plate-iron or steel, and folded and stamped into shape cold. Figs. 6, 7, and 8 are views corresponding, respectively, with Figs. 3, 4, and 5, the point of the central portion having a projection or shoulder, as hereinbefore described. Figs. 9, 10, and 11 are views of a similar fastener, in which the two outside partions are narrower, and central or opposite to each other; and Figs. 12, 13, and 14 are corresponding views of a similar fastener, differing only from Figs. 9, 10, and 11 by the addition of the shoulders or projections at the point of the central portion or tongue.

These latter fasteners are not intended to be formed out of plate-iron, but may be conveniently cast in iron or steel.

Claim.

In combination with the folded, bent-over, or hooked ends of a metallic band, I claim the tie A, when provided with a solid back, B, open slots C, and central tongue or plate D, all constructed, combined, and arranged to operate in the manner described and shown, and for the purpose set forth.

In testimony whereof I, the said WILLIAM McNABB, have signed my name to this specification in presence of two subscribing witnesses this 5th day of February, 1870.

WILLIAM McNABB.

Witnesses:
WILLIAM SMITH, C. E.,
W. S. WYNN.